(12) United States Patent
Masoian

(10) Patent No.: US 7,643,791 B2
(45) Date of Patent: Jan. 5, 2010

(54) METHOD AND APPARATUS FOR OPTIMIZING SIGNAL PROCESSING

(75) Inventor: Leon Michael Masoian, West New York, NJ (US)

(73) Assignee: Airorlite Communications, Inc., Fair Lawn, NJ (US)

( * ) Notice: Subject to any disclaimer, the term of this patent is extended or adjusted under 35 U.S.C. 154(b) by 526 days.

(21) Appl. No.: 11/652,805

(22) Filed: Jan. 12, 2007

(65) Prior Publication Data

US 2008/0171527 A1 Jul. 17, 2008

(51) Int. Cl.
*H04B 7/14* (2006.01)

(52) U.S. Cl. .......................... 455/11.1; 455/14; 455/266

(58) Field of Classification Search ............ 455/7, 455/11.1, 14, 15, 16, 63.1, 67.13, 266, 307, 455/523
See application file for complete search history.

(56) References Cited

U.S. PATENT DOCUMENTS

| 2002/0123306 | A1 | 9/2002 | Masoian |
| 2004/0131125 | A1 | 7/2004 | Sanderford, Jr. et al. |
| 2007/0155314 | A1* | 7/2007 | Mohebbi ................ 455/11.1 |

* cited by examiner

*Primary Examiner*—Thanh C Le
(74) *Attorney, Agent, or Firm*—Crowell & Moring LLP

(57) ABSTRACT

An booster/amplifier receives a plurality of RF signals, including a subject RF signal. A location-based signal spectrum is determined by performing either a frequency scan or an information lookup operation. An initial filter bandwidth for the booster/amplifier is set based at least in part on the determined signal spectrum and a target time delay interference. In one embodiment, the initial filter bandwidth is set such that both the TDI and ACI are optimized/minimized. The initial filter bandwidth subsequently may be adjusted from its initial value based on actual measured ACI and/or TDI values.

31 Claims, 7 Drawing Sheets

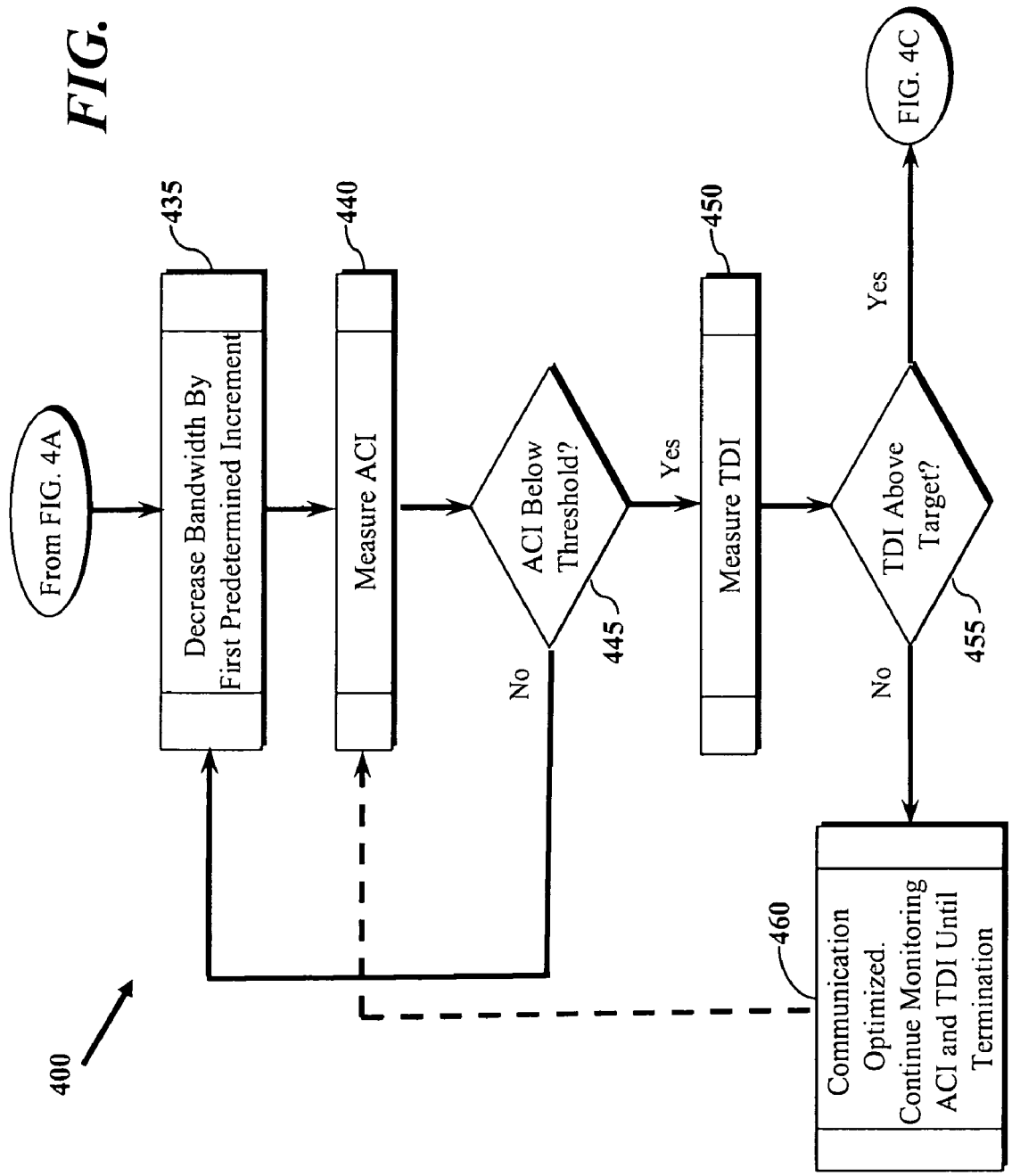

METHOD AND APPARATUS FOR OPTIMIZING SIGNAL PROCESSING

FIELD OF THE INVENTION

The present invention relates generally to wireless communications systems and more particularly to methods and apparatus for optimizing wireless signal processing by optimizing/minimizing time delay interference and adjacent-channel interference.

BACKGROUND OF THE INVENTION

Radio Frequency (RF) repeaters (also referred to as boosters or amplifiers) are electronic devices that receive a weak or low-level radio frequency signal and retransmits it at a higher level or higher power, such that the signal can cover longer distances without degradation. RF repeaters have application in radio dispatching, amateur radio, and emergency service communications. With many emergency and dispatching systems, the repeater is incorporated into the wireless base station, which performs both the receiving and transmitting functions for various services. These includes police, fire brigade, ambulance, taxicab, tow truck, and other services. Additionally, repeaters are commonly used in areas that are obscured from base station coverage, such as tunnels, subways, large indoor areas, etc.

Repeaters are notoriously susceptible to signal interference from neighboring signals, referred to herein as adjacent-channel interference (ACI). To counter this problem, repeaters or boosters have utilized an architecture in which an input signal is heterodyned with an intermediate frequency. This heterodyned signal is then filtered through a narrow bandwidth and then re-heterodyned back to the same received signal before re-transmission. Current designs utilize narrow-band filtering which allows essentially only the signal itself and its information to be passed, thereby eliminating much of the previously-mentioned interference inherent in such systems. In essence, it was recognized that the narrower the filtering bandwidth, the lower the interference from adjacent-channel signals.

However, it has been discovered that a significant performance penalty for this approach is in the time delay that such signal processing creates. That is, while the output signal may be identical to the input signal in frequency and content, will be delayed in time with respect to the input signal. This time delay is a function of the filter(s) bandwidth and the number of filter sections used. The effect of this time delay is known as time-delay interference (TDI), which is when two or more timed-delayed versions of the same signal are received and the end of the communication line. In certain communication environments, TDI is seen at the receiver-side as distortion or drops in audio communication, and as loss of data in the data transmission. Thus, there exists an inverse relationship between the amount of TDI and the amount of inter-modulation or adjacent-channel distortion.

Accordingly, what is needed is a method and apparatus which overcome one or more of the aforementioned drawbacks by optimizing/minimizing TDI and ACI during signal amplification.

SUMMARY OF THE INVENTION

Disclosed and claimed herein is a method and apparatus for amplifying a subject RF signal having a subject frequency. In one embodiment, a method includes receiving a plurality of RF signals, including the subject RF signal, determining a location-based signal spectrum for the plurality of RF signals, and setting an initial signal filter bandwidth based at least in part on the location-based signal spectrum and a target TDI. The method further includes filtering out the plurality of RF signals which are outside the initial signal filter bandwidth, and then amplifying the subject RF signal at the subject frequency.

Other aspects, features, and techniques of the invention will be apparent to one skilled in the relevant art in view of the following description of the exemplary embodiments of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIGS. 4A-4C depicts another embodiments of a process for boosting a subject RF signal in accordance with the principles of the invention.

DETAILED DESCRIPTION OF THE EXEMPLARY EMBODIMENTS

Figure 1:
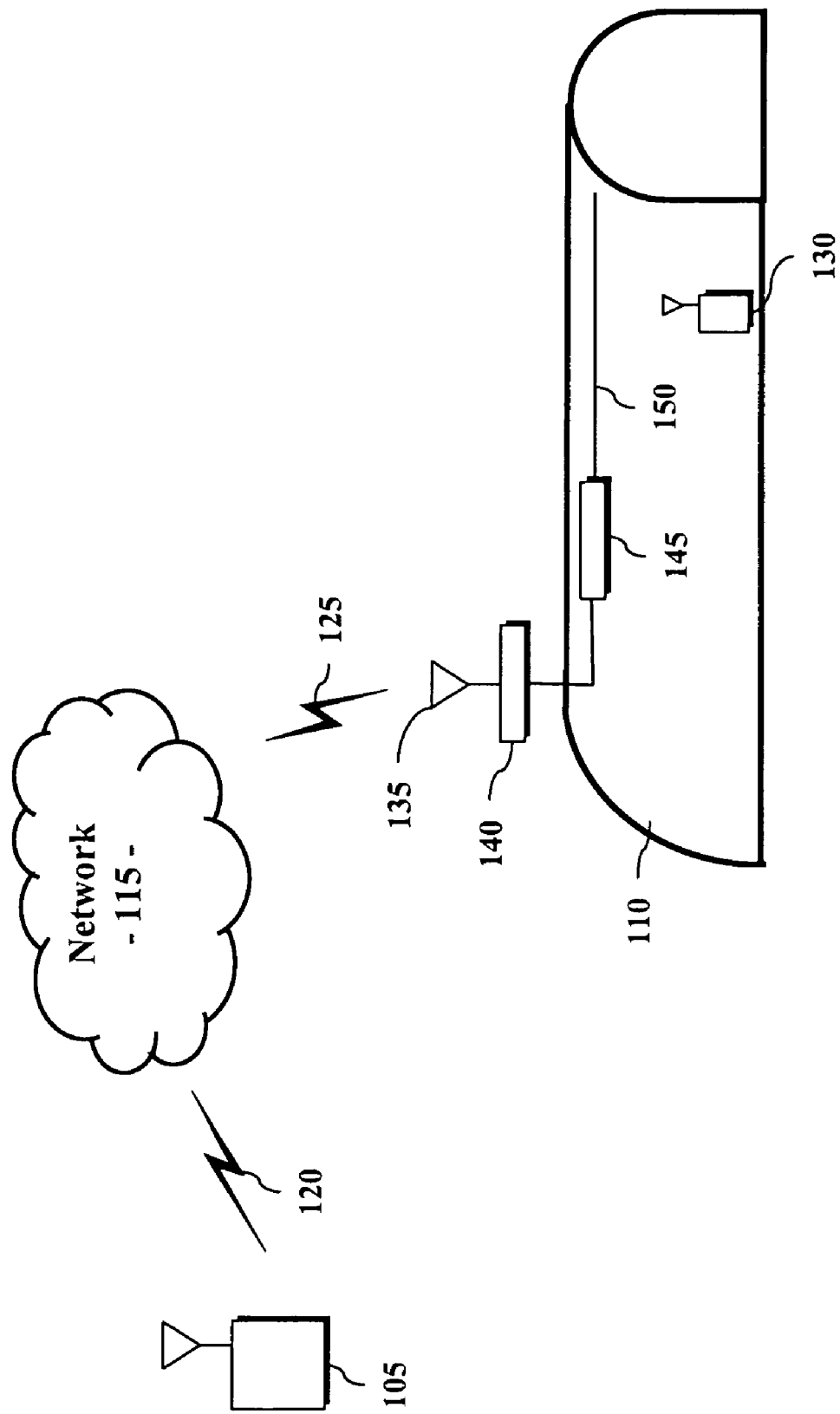
FIG. 1 is a system diagram illustrating one embodiment of a wireless communication system in which one or more aspects of the invention may be implemented.

The present disclosure relates to signal amplification in which TDI and ACI are to be optimized/minimized. In one embodiment, a booster/amplifier receives a plurality of RF signals, including a subject RF signal. A location-based signal spectrum for the plurality of RF signals is determined by performing either a frequency scan or an information lookup operation. An initial filter bandwidth for the booster/amplifier may then be set based at least in part on the determined signal spectrum and a target time delay interference. In one embodiment, the initial filter bandwidth is set such that both the TDI and ACI are optimized/minimized. Thereafter, those RF signals outside the initial signal filter bandwidth may be filtered out, leaving the subject RF signal to be amplified and re-radiated, in accordance with one embodiment of the invention.

As will be described in more detail herein, the filter bandwidth subsequently may be adjusted from its initial value based on actual measured ACI and/or TDI values. In one embodiment, ACI may be a function of one or both of the Received Signal Strength Indication (RSSI) and the resulting signal noise (e.g. signal-noise ratio (SNR)) caused by signals occupying adjacent channels to that of the subject signal. As is generally know, the SNR is the power ratio between a subject signal and the background noise.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium, which may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, a fiber optic medium, a radio frequency (RF) link, etc.

Referring now to the figures, a communication system in which the invention may be used is described with reference to FIG. 1. FIG. 1 depicts a block diagram of a wireless communication system 100 in accordance with the principles of the invention. FIG. 1 is an exemplary embodiment that may be adapted to many different uses. In one embodiment of FIG. 1, the communication system 100 is a trunking radio system usable by municipalities to communicate between emergency vehicles over a narrowband frequency. In other embodiments, the communication system 100 may be used to provide wireless communications throughout subway systems, vehicle tunnels, inside building or other structures, and any other location in which RF signal propagation may be inhibited. Numerous other applications of the invention are also possible. In essence, the principles of the invention are applicable to any application which makes use of one or more RF repeaters or boosters. As used herein, the terms "repeater," "booster," and "amplifier" will be used to generically describe a device which functions to receive a relatively weak RF communication having a particular modulation and frequency, and then to re-transmit that signal at a stronger signal level, but at the same modulation and frequency.

As depicted, communication system 100 includes a first communication device 105 configured to send and receive wireless communication signals that are to be broadcast across a subject location 120. In another embodiments, communication system 100 may be comprised of a plurality such devices instead of the single depicted device 105. In any case, the first communication device 105 may correspond to an emergency vehicle, such as a police car, fire truck, ambulance or the like. The device 105 may be a handheld portable device (e.g., two-way radio), a vehicle unit, or a fixed base station. It should of course be appreciated that numerous other communication devices and/or applications would be consistent with the principles of the invention.

Communication signals between the communication devices 105 and the location 110 may be transferred via network 115, as shown in FIG. 1. In one embodiment, network 115 may be comprised of one or more intervening base stations, depending on the distance between the first communication device 105 and the location 110. In certain embodiments, the network may be a local area network, a wide area network, the Internet, a cellular communications network or any combination thereof. Communication signal 120 is the communication signal between the communication device 105 and the network 115, while communications relayed between the network 115 and the location 110 are depicted as communication signal 125.

A second communication device 130 is shown inside location 110. The location 110 in this embodiment is a subway tunnel, but may similarly be a vehicle tunnel, a building or any other area which would benefit from the use of an RF booster. In one embodiment, the second communication device 130 may correspond to an emergency vehicle, a subway car, etc.

In certain embodiments, the second communication device 130 would have difficulty receiving an RF communication from the first communication device 105 due to the confined nature of the location 110, which would tend to block or otherwise inhibit any such signals. To alleviate this, an antenna 135 is mounted outside the location 110. At some point downstream from the antenna 135 is a filtering circuit 140 and a booster 145, which in turn may be coupled to one or more radiating cables 150 that run inside the location 110. Radiating cable 145 is essentially a long cable antenna which may be useful in certain particularly confined locations. In another embodiment, the filtering circuit 140 and booster 145 may be integrated into a single device/circuit, which may or may not be located within location 110. It should further be appreciated that radiating cable 150 may include any antenna shape/design depending on the nature/configuration of the location 110. That is, the use of a radiating cable 150 or any other antenna type is merely a design choice.

In operation, the first communication device 105 communicates with the second communication device 130 by transmitting a communication signal as signal 120 to network 115, which in turn transmits signal 125 to antenna 135. Antenna 135 receives the communication signal 125 and passes it to the band pass filter 140, which filters out signals residing in frequency ranges outside the expected range of received communication. It should further be appreciated that the communication signal 125 may under additional pre-processing as is generally known in the art. The communication signal may then be passed to booster 145 where the signal may be boosted sufficiently to be sent over radiating cable 150. The signal may then be received by the second communication device 130 from the radiating cable 150.

Similarly, the second communication device 130 may itself transmit a communication signal by broadcasting the signal for reception by the radiating cable 150, back through the booster 145, and to the band pass filter 140. The filtered communication may then be sent back through the network 115, which may in turn broadcast the communication to be received by the first communication device 105. Such transmission will typically occur back and forth as necessary. The network 115 may not always be needed and will depend on the location of the first communication device 105 and the strength of the transmitted signal. In some embodiments, the first communication device 105 directly communicates with antenna 135.

While communications between the first communication device 105, network 115 and antenna 135 are shown simply as signals 120 and 125, in a typical trunking radio system there are separate channels for receiving and transmitting. For example, there may be 8 channels for receiving and 8 channels for transmitting. Again, numerous other communication configurations would be consistent with the principles of the invention.

Figure 2:
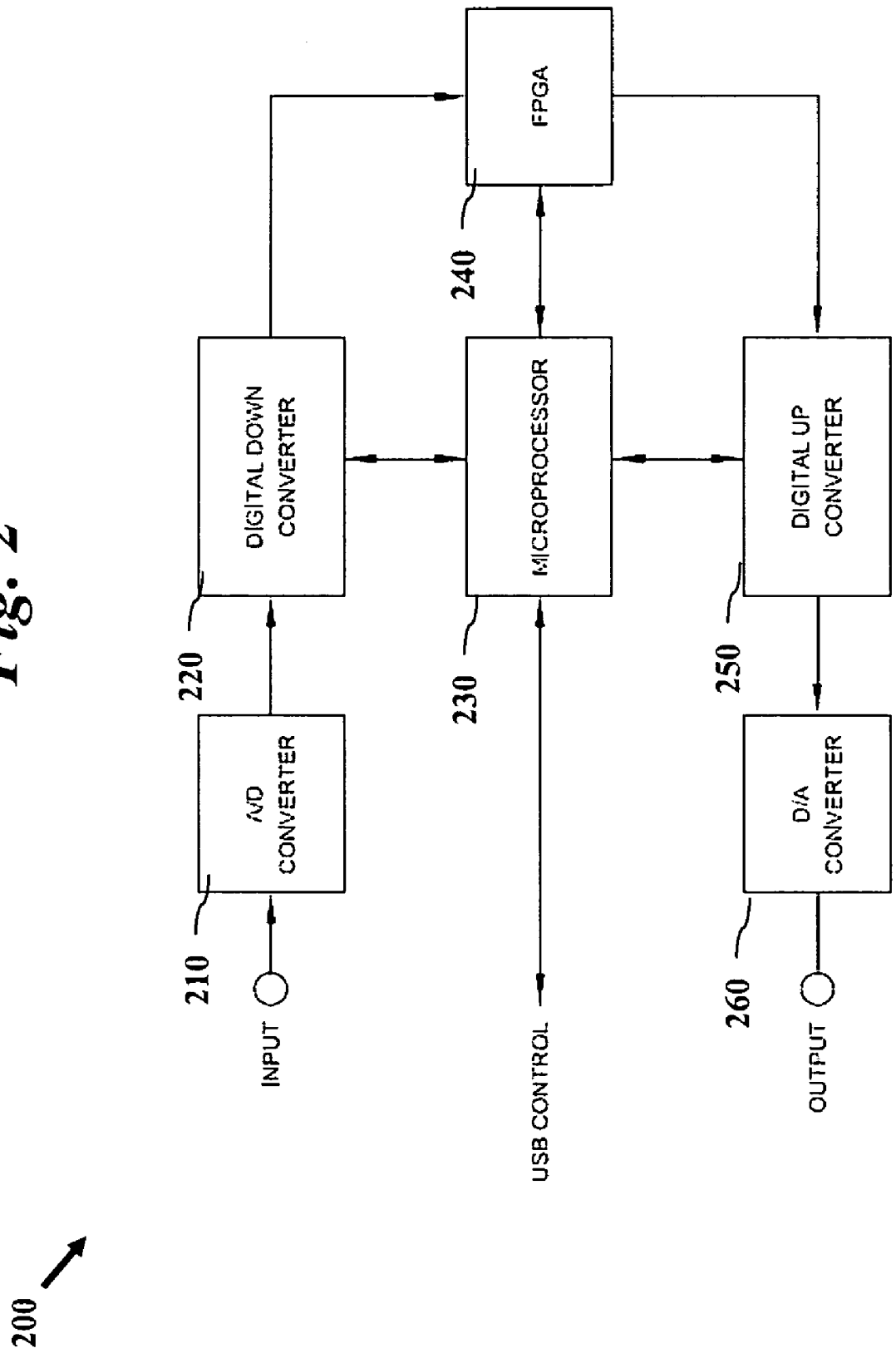
FIG. 2 is a block diagram of one embodiment of a digital signal processor for implementing one or more aspects of the invention.

Referring now to FIG. 2, depicted is a block diagram for one embodiment of a digital signal processor (DSP) 200 capable of implementing one or more aspects of the invention. While in one embodiment, the DSP 200 is a 4-Channel DSP and includes an Analog-to-Digital converter (ADC) 210 for receiving one or more input RF signals and digitizing the analog signal at a prescribed sampling rate (e.g., 80 Mbs).

The DSP 200 further includes a Digital Down Converter (DDC) 220, a Field Programmable Gate Array (FPGA) 240 and a Digital Up Converter (DUC) 250, each of which are electrically connected to a microprocessor 230. Finally, the DSP 200 may further include a Digital-to-Analog converter (DAC) 260 for providing an analog boosted/amplified RF signal for re-radiation.

It should be appreciated that the DDC 220 may have a plurality of independent channels (e.g., 4 channels), each of which may have a Numerically Controlled Oscillator (NCO) for tuning, a comb filter for decimation, an automatic gain control loop, and a low pass filter. The DUC 250 may have a corresponding number of channels, each of which may include an NCO and filter as well.

In certain embodiments, the FPGA 240 may be configured to make the DDC 220 output compatible with the DUC 250 input. The FPGA 240 may be further configured to transfer data between the microprocessor 230 and each of the DDC 220 and DUC 250, as well as allow for future processing enhancements.

At power on or set up, the microprocessor 230 may be used to program the FPGA 240 bit-pattern at power on (e.g., via USB control). The microprocessor 230 may also initialize the DDC 220 and DUC 250, as well as monitor their status. It should be appreciated that the microprocessor 230 may include any known interface (e.g., RS-232) for enabling configuration from a remote terminal, as well as a USB interface for high-speed data transfers between a remote terminal and the DSP 200. However, it should equally be appreciated that the microprocessor 230 may have numerous other interface configurations.

While a booster/amplifier of one embodiment of the invention may be implemented using DSP 200, it should equally be appreciated that numerous other configurations and/or architectures may be similarly employed. For example, in an analog environment, the signal processing may be implemented using a trunked channel card which includes a cascading series of these bandpass filters which may be individually switched on and off to adjust the signal flow in accordance with the signal processing described herein.

Figure 3A:
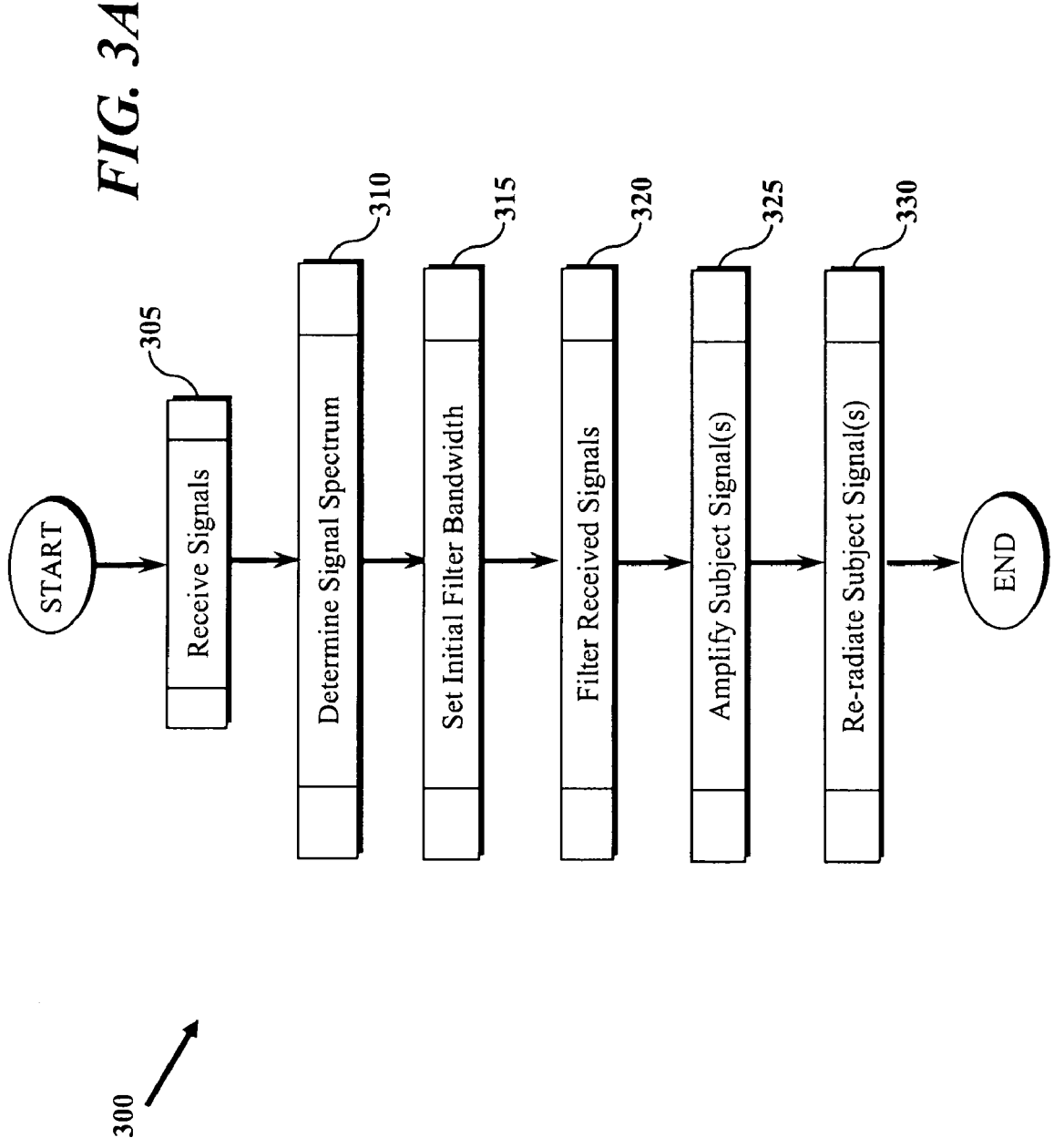
FIGS. 3A and 3B are flow diagrams of embodiments for boosting a subject RF signal in accordance with the principles of the invention.

Referring now to FIG. 3A, depicted is a process for boosting a subject RF signal using a booster/amplifier (e.g., DSP 200) in accordance with one embodiment of the invention. In particular, process 300 begins at block 305 with the booster/amplifier receiving a plurality of RF signals, including the subject signal, across a range of frequencies. Although referred to in the singular throughout this disclosure, it should be appreciated that the subject signal may actually include numerous different subject signals having different subject frequencies. In certain embodiments, the received RF signals may also undergo various known pre-processing operations, such as pre-amplification, signal conditioning and pre-filtering. In a heterodyning architecture, the received signal(s) may also be downconverted with an intermediate frequency (IF) reference signal prior to filtering the signal.

Regardless of the pre-processing applied to the subject signal, process 300 continues to block 310 where a location-based signal spectrum analysis/lookup may be performed. In one embodiment, a location-based signal spectrum analysis is performed by scanning a predetermined range of frequencies for the possible presence of other RF signals neighboring the subject signal at the location in question (e.g., location 110). In one embodiment, this predetermined range is ±100 kHz, although the range may similarly be wider or narrower. In certain embodiments, a particular filter bandwidth (e.g., 25 kHz) is slid across the predetermined range of frequencies while the signal strength of the various received signal is measured, along with the corresponding signal noise levels.

Alternatively, the location-based signal spectrum may be determined by accessing pre-stored values representative of the frequencies on which various other RF signals may be present. Either way, possible signals occupying frequencies adjacent to the subject signal may be identified at block 310. As will be described below, this information may then be used to determine the amount of ACI caused by neighboring signals which is likely for a given filter bandwidth.

Process 300 continues to block 315 where the an initial signal filter bandwidth, which includes the subject frequency, may be set. In certain embodiments, the initial signal filter bandwidth is based at least in part on the location-based signal spectrum determined above at block 310 and/or a target TDI. In certain embodiments, the TDI value may be based on the type of subject signal (e.g., a data signal, voice signal, etc.). Since voice signals are less susceptible to TDI than data signals, the target TDI for a voice signal need not be as low as for a data signal. To that end, in certain embodiments the target TDI may be no more than 100 microseconds for voice signals and no more than 35 microseconds for data signals. Since TDI is seen at the receiver-side as distortion or drops in audio communication, and as loss of data in data transmissions, in another embodiment the target TDI may be based upon the amount of time delay which is tolerable for a given data type.

In certain embodiments, the initial signal filter bandwidth to be set at block 315 (e.g., 25 kHz) may be such that, given the location-based signal spectrum determined at block 310, the expected amount of ACI is not greater than a predetermined threshold. That is, the initial signal filter bandwidth may be set to the widest value possible without exceeding a tolerable ACI level. In one embodiment, this threshold may be based on the combination of the signal strength (e.g., RSSI) of an adjacent signal, as well as the resulting signal noise (e.g., SNR) caused thereby. For example, the threshold ACI may be at the point where the RSSI of an adjacent signal is greater than X (e.g., greater than −90 dBm) and the signal noise level thereof is greater than Y (e.g., greater than 13 dB). While this may describe one way to set a predetermined ACI threshold, it should of course be appreciated that the threshold ACI may be similarly computed according to different criteria and/or algorithms. For example, the threshold ACI may be based on either the RSSI or the SNR of the subject signal individually. In addition, the signal strength threshold X and signal noise threshold Y may be subjectively set at higher or lower levels than those described herein.

In another embodiment, the initial signal filter bandwidth may be set such that an expected TDI is not greater than the target TDI. In this embodiment, the initial signal filter bandwidth is set to the narrowest value possible without exceeding a tolerable amount of TDI. In still another embodiment, the initial signal filter bandwidth may be set to a value which optimizes both the ACI and the TDI experienced.

Once the initial signal filter bandwidth has been set at block 315, process 300 may continue to block 320 where one or more bandpass filters of the booster/amplifier (e.g., DSP 200) may filter out those received RF signals which are outside the initial signal filter bandwidth. The remaining subject signal may then be amplified at block 325 using known amplification means. Finally, at block 330 the subject RF signal may then be re-radiated at the subject frequency and at the newly-amplified level. In a heterodyning architecture, the previously-heterodyned subject signal may need to be upconverted and the IF reference signal heterodyned back to the input signal prior to re-radiation.

Figure 3B:
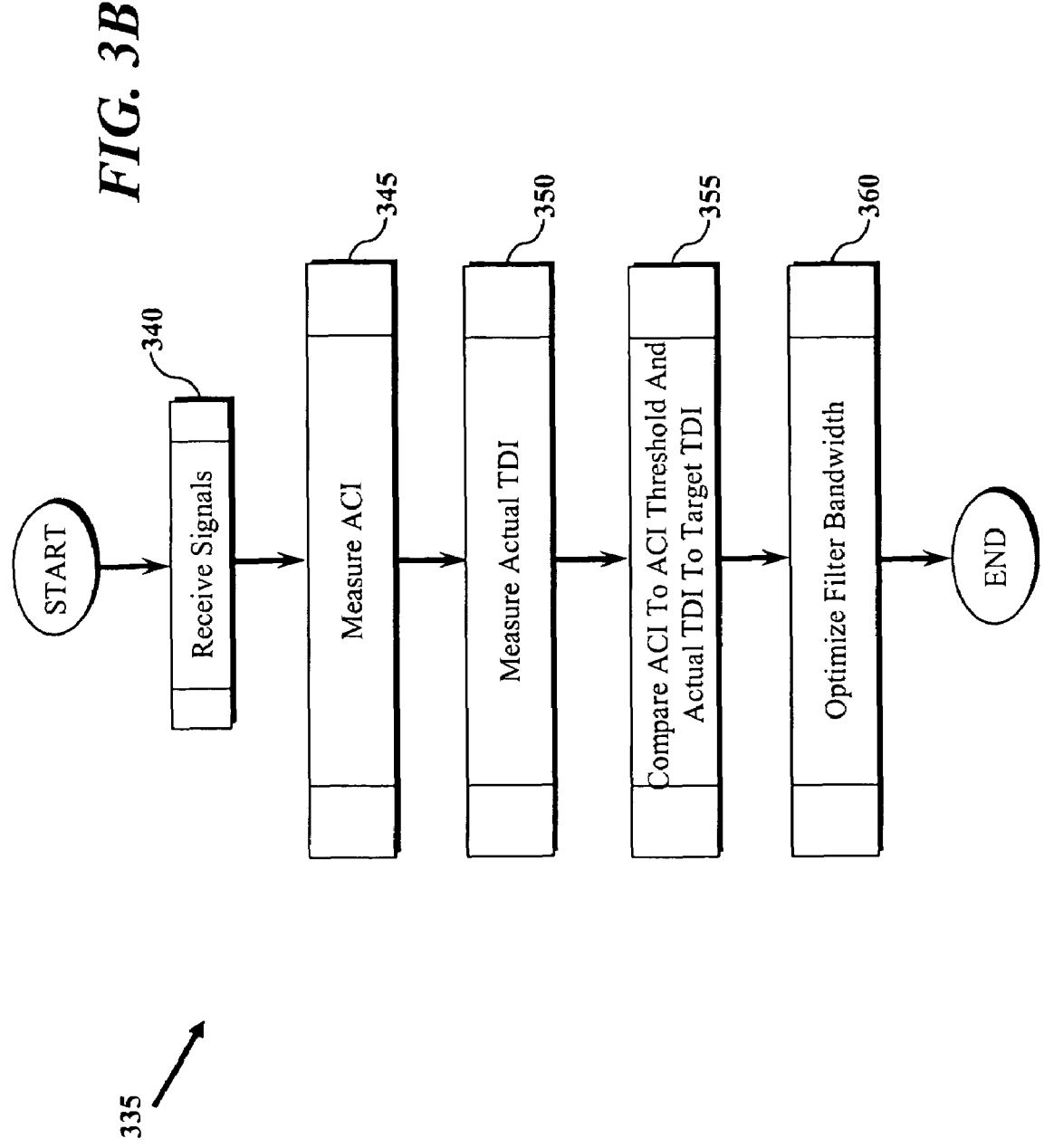

FIG. 3B depicts another process of boosting/amplifying a subject RF signal using a booster/amplifier (e.g., DSP 200) in accordance with one embodiment of the invention. Process 335 begins at block 340 with the booster/amplifier receiving a plurality of RF signals, including the subject signal(s), across a range of frequencies. As with process 300, the received RF signals may also undergo various known pre-processing operations, such as pre-amplification, signal conditioning and pre-filtering.

Process 335 continues to block 345 where the amount of ACI is measured for the subject signal. Thereafter, the amount of TDI the subject signal is experiencing may also be measured at block 350. Process 335 may then continue to block 355 where two comparisons may be performed. First, the actual amount of ACI in the subject signal is compared to a threshold value. As previously mentioned, the ACI threshold may be a function of either or both of the adjacent channel signal strength (e.g., greater than −90 dBm) and signal noise (e.g., greater than 13 dB). Second, the amount of actual TDI of the subject signal is compared to a target TDI value. As mentioned above, the target TDI for a voice signal may be no more than 100 microseconds in one embodiment, while the target TDI for a data signal may be no more than 35 microseconds.

Process 335 may then continue to block 360 where the booster's filter bandwidth may be optimized based on both the ACI and the TDI. In certain embodiments, this optimization may involve increasing the filter bandwidth when the actual TDI is greater than the target TDI, and decreasing the filter bandwidth when the ACI exceeds the ACI threshold. It should further be appreciated that the optimization operation of block 360 may favor either one of reducing ACI or reducing TDI based on such factors as user preference, diminishing effects of additional reduction, type of signal, etc.

Figure 4A:
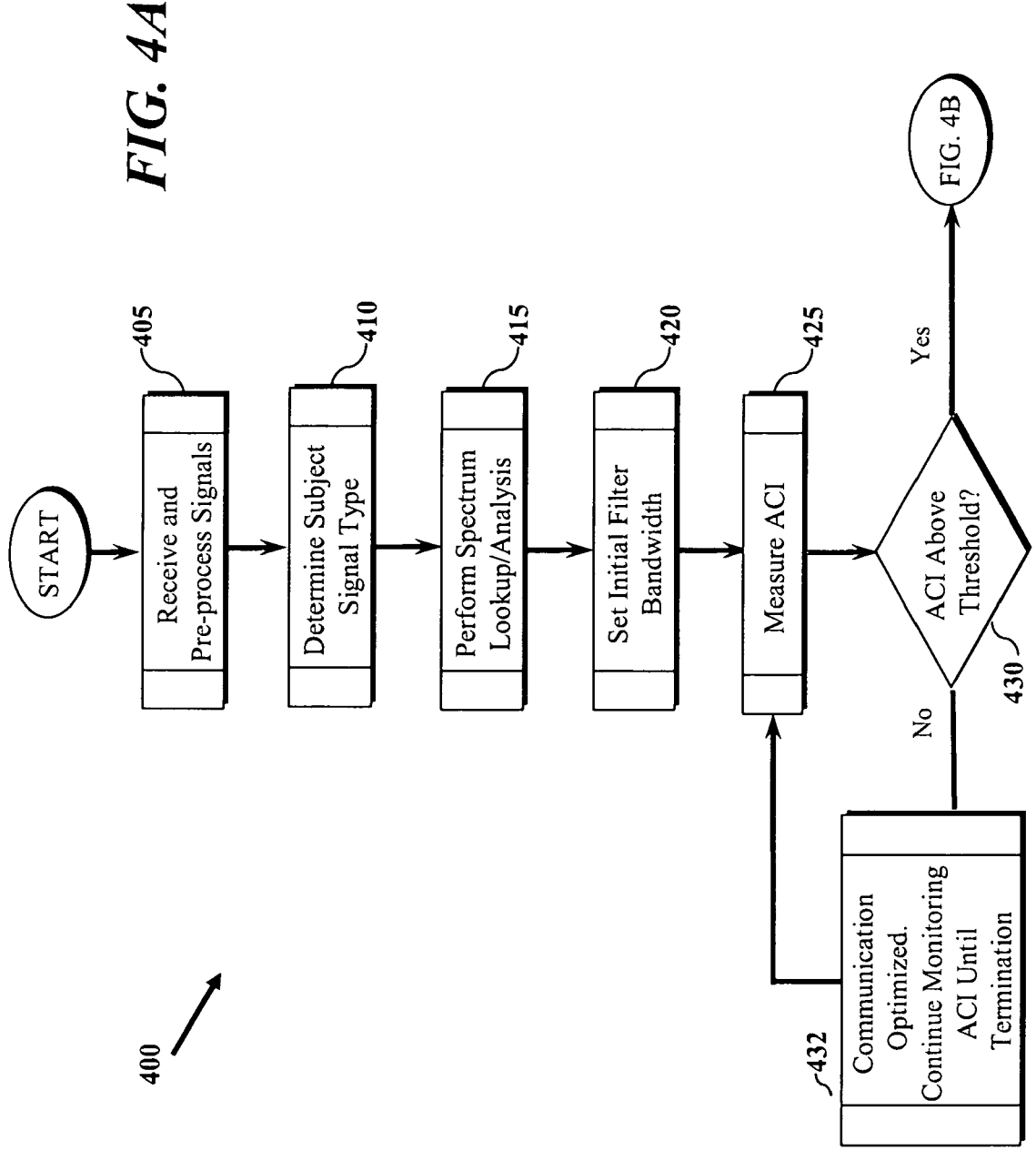

Referring now to FIG. 4A, depicted is a more detailed process for implementing one or more aspects of one embodiment of the invention using a booster/amplifier. In particular, process 400 begins at block 405 with the receiving and pre-processing of a plurality of RF signals across a range of frequencies. This receiving and pre-processing operation may be the same as the operations carried out at block 305 of FIG. 3A.

Process 400 may then continue to block 410 where the type of the subject signal received is determined. In one embodiment, this determination may be made by determining if the signal properties indicate a voice signal or a data signal. It should be appreciated that this determination may be made using any known technique. It should further be appreciated that the subject signal may actually include numerous different subject signals having different subject frequencies.

Once the type of subject signal is determined, process 400 may continue to block 415 where a signal spectrum analysis or lookup may be performed. As with the operations of block 310, the analysis/lookup operation of block 415 may be performed by scanning a predetermined range of frequencies for the possible presence of other RF signals neighboring the subject signal at the location in question (e.g., location 110). Alternatively, the location-based signal spectrum may be determined by accessing pre-stored values representative of the frequencies on which various other RF signals may be present. It should be appreciated that such information may be stored in a local memory or accessed from a remotely-located source. Either way, information representing the presence of possible signals occupying frequencies adjacent to the subject signal is determined at block 415.

Process 400 continues to block 420 where an initial signal filter bandwidth, which includes the subject frequency, may be set. Using the information gather at block 415 on possible adjacent signals, in one embodiment the initial signal filter bandwidth may be set such that an expected amount of ACI will not be greater than a predetermined ACI threshold. That is, the initial signal filter bandwidth may be set to a relatively wide value (e.g., 50 kHz band) that is just below where a tolerable ACI level or threshold is expected to be exceeded.

Once the initial signal filter bandwidth has been set at block 420, process 400 may continue to block 425 where the actual ACI experienced by the subject signal may be measured. As previously mentioned, this may be done by measuring one or more of the signal strength of adjacent signal(s) and the resulting signal noise caused thereby.

Once the actual ACI is measured, process 400 continues to decision block 430 where a determination may be made as to whether the measured ACI exceeds the predetermined threshold. If not, process 400 will continue to block 432 where the ACI level may be continually monitored until signal termination. Since the initial bandwidth was set to be at the widest tolerable level, in one embodiment it may safely be assumed that TDI is also optimized/minimized. In one embodiment, this continued monitoring of the ACI may be done by periodically reverting to block 425. If, on the other hand, it is determined at block 430 that the measured ACI is above the threshold level, process 400 will continue to block 435 of FIG. 4B.

FIG. 4B continues process 400 at block 435 where the initial filter bandwidth is decreased by a first predetermined increment. In one embodiment, this first predetermined increment may be between 6.25 Hz and 12.5 kHz. By narrowing the bandwidth, the interference from neighboring signals should decrease.

Process 400 continues to block 440 where again the subject signal's ACI is measured. Thereafter, a determination may again be made at block 445 as to whether the actual ACI measured at block 440 is now below the predetermined threshold. If not, process 400 will loop back to block 435 where the filter's bandwidth will again be decreased by the first predetermined increment. In this fashion, process 400 will iteratively proceed until the ACI is below the threshold.

At this point, the initial bandwidth will have been narrowed to the point where ACI is optimized/minimized. However, since the effect of a narrower bandwidth is increased TDI, process 400 will need to measure the resulting TDI at block 450. This actual TDI is then compared to the target TDI at block 455. If the actual TDI does not exceed the target TDI, then both the ACI and TDI are optimized/minimized for the amplification of the subject signal at the subject location. At block 460, the actual ACI and TDI may continue to be monitored until signal termination. In one embodiment, this continued monitoring may be done by periodically reverting to block 440 of process 400 to measure ACI and TDI.

Figure 4C:
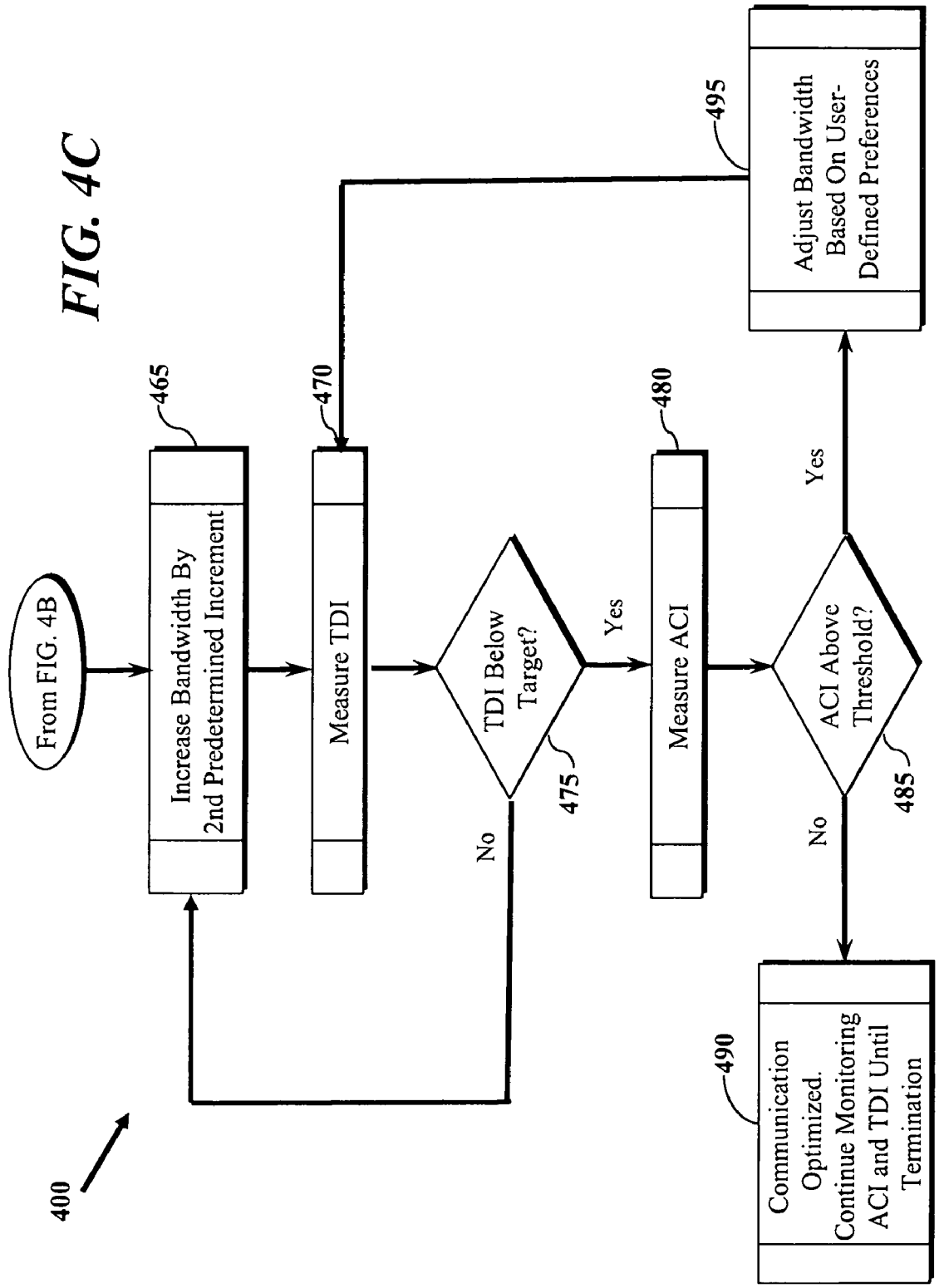

If, on the other hand, it is determined at block 455 that the TDI is above the target TDI value, process 400 may move to block 565 of FIG. 4C where the filter bandwidth is increased by a second predetermined increment. While in one embodiment the first and second predetermined increments may be the same, in another embodiment the second predetermined increment may be less than the first increment. By way of example, while the first predetermined increment may be between 6.25 Hz and 12.5 kHz, the second predetermined increment may be between 1 kHz and 5 kHz. In this fashion, if increasing the bandwidth by the first predetermined increment overshoots the optimized value, the smaller second predetermined increment will be more likely to converge on the optimal bandwidth value.

Once the bandwidth has again been adjusted at block 465, process 400 may then measure the actual resulting TDI at block 470. Thereafter, a determination may again be made at block 475 as to whether the actual TDI measured at block 465 is now below the target TDI value. If not, process 400 will loop back to block 465 where the filter's bandwidth will again be decreased by the second predetermined increment. In this fashion, process 400 will iteratively proceed until the TDI is below the target TDI level.

Once it is determined at block 475 that the TDI is now no greater than the target TDI, process 400 may continue to block 480 where the ACI may again be measured. A comparison may then be made between the actual ACI measured at block 480 and the predetermined ACI threshold at block 485. If the actual ACI does not exceed the threshold ACI value, then both the ACI and TDI are optimized/minimized for the amplification of the subject signal at the subject location. In this case, process 400 will continue to block 490 where the actual ACI and TDI may continue to be monitored until signal termination. In one embodiment, this continued monitoring may be done by periodically measuring one or both of the actual ACI and TDI.

In the event, however, that it is determined at block 485 that the ACI is now above the predetermined threshold due to excessive widening of the bandwidth at block 465, process 400 will move to block 495 where one or more user-defined preferences may be used to fine tune or otherwise adjust the filter bandwidth. In one embodiment, such user-defined preferences may indicate a preference for optimizing either ACI or TDI. Such user-defined preferences may be location-specific and/or service specific.

For the sake of simplicity, processes 300, 335 and 400 have been defined in general steps and it should be appreciated that other steps consistent with the principles of the invention may be included. While the invention has been described in connection with various embodiments, it should be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for amplifying a subject radio frequency (RF) signal having a subject frequency comprising the acts of:
   receiving a plurality of RF signals, including the subject RF signal;
   determining a location-based signal spectrum for the plurality of RF signals;
   setting an initial signal filter bandwidth, which includes the subject frequency, based at least in part on the location-based signal spectrum and a target time delay interference (TDI); and
   filtering out the plurality of RF signals which are outside the initial signal filter bandwidth; and
   amplifying the subject RF signal at the subject frequency.

2. The method of claim 1, wherein determining the location-based signal spectrum comprises analyzing a predetermined range of frequencies at a subject location to identify a plurality of frequencies that correspond to the plurality of RF signals.

3. The method of claim 1, wherein determining the location-based signal spectrum comprises performing a lookup operation of stored values representative of a plurality of frequencies that correspond to the plurality of RF signals at a subject location.

4. The method of claim 1, further comprising the act of determining a signal type of the subject RF signal, wherein the target TDI is based at least in part on said signal type.

5. The method of claim 4, wherein the signal type is selected from the list consisting of: a data signal and a voice signal.

6. The method of claim 5, wherein the target TDI is less than 100 microseconds when said signal type is voice signal, and wherein the target TDI is less than 35 microseconds when said signal type is data signal.

7. The method of claim 1, further comprising the acts of:
   measuring adjacent-channel interference of the subject RF signal;
   measuring actual TDI of the subject RF signal; and
   adjusting the initial signal filter bandwidth based on said adjacent-channel interference and actual TDI.

8. The method of claim 7, wherein adjusting the initial signal filter bandwidth comprises increasing the initial signal filter bandwidth when the actual TDI is greater than the target TDI, and decreasing the initial signal filter bandwidth when the adjacent-channel interference exceeds a predetermined threshold.

9. The method of claim 1, wherein setting the initial signal filter bandwidth, comprises setting the initial signal filter bandwidth such that an amount of adjacent-channel interference is not greater than a predetermined threshold.

10. The method of claim 9, wherein the predetermined threshold is based on at least one of a signal strength for the subject RF signal and a signal noise level for the subject RF signal.

11. The method of claim 1, wherein setting the initial signal filter bandwidth, comprises setting the initial signal filter bandwidth such that an actual TDI is not greater than the target TDI.

12. The method of claim 1, further comprising the act of re-radiating the subject RF signal at the subject frequency at an amplified level.

13. A method for optimizing a signal booster's filter bandwidth, the method comprising the acts of:
   receiving a plurality of radio frequency (RF) signals including a subject RF signal having a subject frequency;
   measuring adjacent-channel interference of the subject RF signal;
   measuring an actual time delay interference (TDI) of the subject RF signal;
   comparing the actual TDI to a target TDI;
   comparing the adjacent-channel interference to a predetermined threshold; and
   optimizing the signal filter bandwidth, which includes the subject frequency, based at least on said comparisons.

14. The method of claim 13, further comprising the acts of:
   filtering out the plurality of RF signals that are outside the signal filter bandwidth;

amplifying the subject RF signal at the subject frequency;
re-radiating the subject RF signal at the subject frequency at an amplified level.

15. The method of claim 13, further comprising the act of determining a signal type of the subject RF signal, wherein the target TDI is based at least in part on said signal type.

16. The method of claim 15, wherein the signal type is selected from the list consisting of: a data signal and a voice signal.

17. The method of claim 16, wherein the target TDI is less than 100 microseconds when said signal type is voice signal, and wherein the target TDI is less than 35 microseconds when said signal type is data signal.

18. The method of claim 13, wherein optimizing the initial signal filter bandwidth comprises increasing the signal filter bandwidth when the actual TDI is greater than the target TDI, and decreasing the signal filter bandwidth when the adjacent-channel interference exceeds a predetermined value.

19. The method of claim 13, wherein the predetermined threshold is based on at least one of a signal strength for the subject RF signal and a signal noise level for the subject RF signal.

20. An apparatus for amplifying a subject radio frequency (RF) signal having a subject frequency comprising:
 a receiver configured to receive a plurality of RF signals, including the subject RF signal;
 a signal filter electrically coupled to the receiver;
 an amplifier electrically coupled to the signal filter and configured to amplify the subject RF signal at the subject frequency;
 a processor coupled to at least the signal filter, the processor configured to
  set an initial signal filter bandwidth for the signal filter, wherein said initial signal filter bandwidth includes the subject frequency, and is based at least in part on a location-based signal spectrum and a target time delay interference (TDI).

21. The apparatus of claim 20, wherein the location-based signal spectrum is based on analyzing a predetermined range of frequencies at a subject location to identify a plurality of frequencies that correspond to the plurality of RF signals.

22. The apparatus of claim 20, wherein the location-based signal spectrum is based on a lookup operation of stored values representative of a plurality of frequencies that correspond to the plurality of RF signals at a subject location.

23. The apparatus of claim 20, wherein the processor is further configured to determine a signal type of the subject RF signal, wherein the target TDI is based at least in part on said signal type.

24. The apparatus of claim 23, wherein the signal type is selected from the list consisting of: a data signal and a voice signal.

25. The apparatus of claim 24, wherein the target TDI is less than 100 microseconds when said signal type is voice signal, and wherein the target TDI is less than 35 microseconds when said signal type is data signal.

26. The apparatus of claim 20, wherein the processor is further configured to,
 measure adjacent-channel interference of the subject RF signal;
 measure an actual TDI of the subject RF signal; and
 adjust the initial signal filter bandwidth based on said adjacent-channel interference and actual TDI.

27. The apparatus of claim 26, wherein the processor is configured to adjust the initial signal filter by increasing the initial signal filter bandwidth when the actual TDI is greater than the target TDI, and decreasing the initial signal filter bandwidth when the adjacent-channel interference exceeds a predetermined threshold.

28. The apparatus of claim 20, wherein the processor sets the initial signal filter bandwidth such that an amount of adjacent-channel interference is not greater than a predetermined threshold.

29. The apparatus of claim 28, wherein the predetermined threshold is based on at least one of a signal strength for the subject RF signal and a signal noise level for the subject RF signal.

30. The apparatus of claim 20, wherein the processor sets the initial signal filter bandwidth such that an actual TDI is not greater than the target TDI.

31. The apparatus of claim 20, wherein the signal filter is configured to filter out the plurality of RF signals which are outside the initial signal filter bandwidth.

* * * * *